(12) United States Patent
Mizuki et al.

(10) Patent No.: US 8,585,498 B2
(45) Date of Patent: Nov. 19, 2013

(54) IMAGE PROCESSING APPARATUS AND STORING MEDIUM THAT STORES IMAGE PROCESSING PROGRAM

(75) Inventors: Kiyoshi Mizuki, Kyoto (JP); Kenji Yamamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2436 days.

(21) Appl. No.: 10/825,180

(22) Filed: Apr. 16, 2004

(65) Prior Publication Data

US 2004/0209688 A1 Oct. 21, 2004

(30) Foreign Application Priority Data

Apr. 17, 2003 (JP) .................................. 2003-112543

(51) Int. Cl.
*A63F 13/00* (2006.01)
(52) U.S. Cl.
USPC .................................. 463/32; 463/30; 463/31
(58) Field of Classification Search
USPC ....................................................... 463/30–33
See application file for complete search history.

(56) References Cited

U.S. PATENT DOCUMENTS 6,354,944 B1 * 3/2002 Takahashi et al. ............... 463/32
6,424,353 B2 * 7/2002 Yamamoto et al. ........... 345/619

FOREIGN PATENT DOCUMENTS

| JP | 8-315175 | 11/1996 |
| JP | 9-153146 | 6/1997 |
| JP | 2001-269482 | 10/2001 |
| JP | 2002-360920 | 12/2002 |

\* cited by examiner

*Primary Examiner* — Melba Bumgarner
*Assistant Examiner* — Frank M Leiva
(74) *Attorney, Agent, or Firm* — Nixon & Vanderhye P.C.

(57) ABSTRACT

An image processing apparatus includes a CPU, and viewpoint location data each of which is correlated with each plurality of operating objects different in size, which are stored in a main memory, for example. When the operating object appearing in a virtual three-dimensional space is selected based on an operation by a player, the viewpoint location data corresponding to the operating object is read, and a viewpoint location is set. The viewpoint location data is set in such a manner as to display the operating object approximately the same in size even if any operating object different in size is selected, for example. Then, based on this viewpoint location, a three-dimensional image including the operating object is displayed.

9 Claims, 10 Drawing Sheets

Prior Art

VIEWPOINT-LOCATION DATA TABLE

| OPERATING OBJECT | SIZE | VIEWPOINT LOCATION E | |
|---|---|---|---|
| | | DISTANCE X FROM POINT-OF-REGARD I | ANGLE $\alpha$ (HEIGHT H) FROM POINT-OF-REGARD I |
| KART A | LARGE | X1 | $\alpha 1$ (H1) |
| KART B | MEDIUM | X2 | $\alpha 2$ (H2) |
| KART C | SMALL | X3 | $\alpha 3$ (H3) |

- X1 > X2 > X3

- $\alpha 1 > \alpha 2 > \alpha 3$   (H1 > H2 > H3)

IMAGE PROCESSING APPARATUS AND STORING MEDIUM THAT STORES IMAGE PROCESSING PROGRAM

This application claims priority to JP Application No. 2003-112543, filed 17 Apr. 2003. The entire contents of this application are incorporated herein by reference.

FIELD OF THE TECHNOLOGY

The present invention relates to an image processing apparatus and a storing medium that stores an image processing program. More specifically, the technology relates to an image processing apparatus and a storing medium that stores an image processing program that displays an image in which an operating object appearing in a virtual three-dimensional space is seen from a predetermined viewpoint location.

BACKGROUND AND SUMMARY

Examples of conventional kinds of image processing apparatuses are disclosed in, Japanese Patent Laying-open No. 2001-269482 (referred to as prior art 1) and Japanese Patent Laying-open No. 2002-360920 (referred to as prior art 2). The prior art 1 relates to an art in which a viewpoint location is exchanged concurrent with a state change such as a location of an object, etc. When a player's own character, operated by the player, and an enemy character are farther than a predetermined distance, a virtual camera is set to a first viewpoint-location, in which a subjective image for the player's own character is obtained, and when the player's own character and the enemy character are close within the predetermined distance, the virtual camera is set by being exchanged to a second viewpoint-location that increases a visibility of a fighting situation, for example.

In addition, the prior art 2 relates to an art that exchanges to an image display in which a camera viewpoint is brought close to a player character so as to avert an obstacle due to an obstruction when there is an obstruction that obstructs the camera viewpoint between the camera viewpoint and the player character. Furthermore, in a case of bringing the camera viewpoint close to a back of the player character, the player character is made transparent, such as a borderline expression, a translucence expression, etc., so that a visual field is prevented from being obstructed by the player character.

However, the above-described prior arts are arts that exchange the viewpoint location corresponding to a location relationship between an operating object operated by the player and another object. Therefore, it is not possible to respond to a following problem in a game played by selecting one operating object out of a plurality of the operating objects different in size, for example.

That is, in such the game, a range of the visual field obstructed by the operating object itself differs depending on the selected operating object, thus damaging a feeling of equality of the game. This leads to a problem of not being able to realize the same game aspect.

Figure 1:
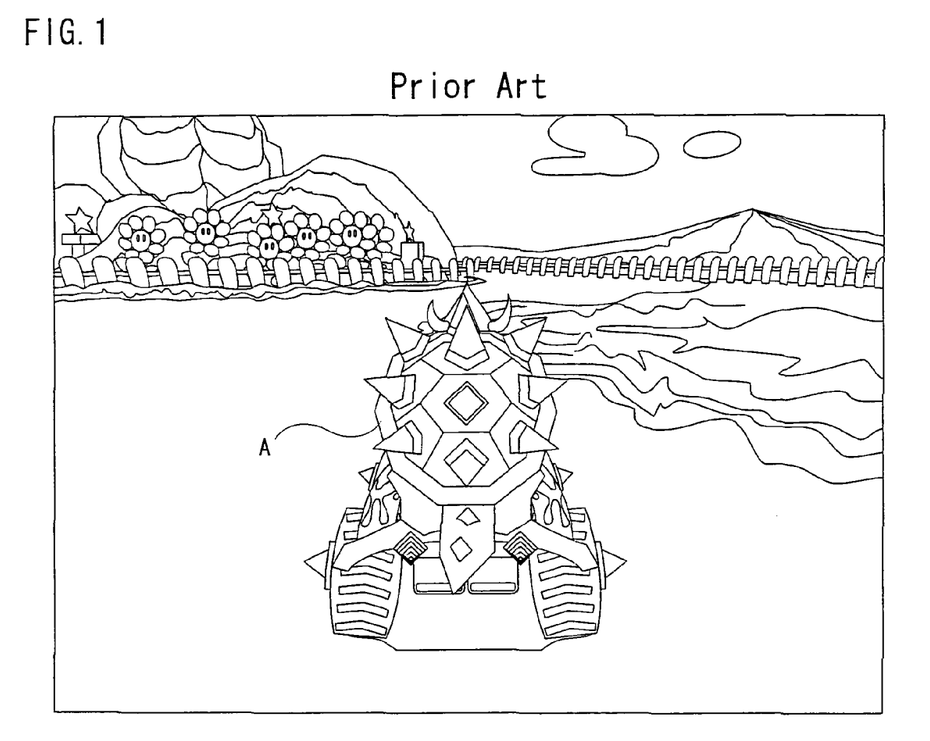
FIG. 1 is an illustrative view showing one example of a game image in the case where a large-sized kart A object is selected in the prior art.

In a conventional race game, for example, capable of selecting a plurality of karts as the operating object, one (unique) viewpoint location is adopted for any kart that is selected. Therefore, in the race game capable of selecting karts in three different sizes (i.e., large, medium, and small) as the operating object, and the viewpoint location renders an optimum image when the kart is medium in size, when the large kart is selected (tall in height, in particular), as shown in FIG. 1, for example, a large range is obstructed by the operating object. This leads to a problem because it becomes difficult to anticipate a course of the kart. To the contrary, when the small kart is selected, the impact of the race tends to become weak due to the size of the kart. Furthermore, a difference in such an obstructing range makes operability different. Thus, in the prior art, due to the difference in size of the selected operating object, the game becomes advantageous or disadvantageous. This leads to the problem that it is not possible to realize the same game aspect with different operating objects. Furthermore, in a fighting game, for example, a problem is that a feeling of unfairness occurs among players.

Therefore, it is a feature of the illustrative embodiments to provide a novel image processing apparatus, and storing medium that stores an image processing program.

Therefore, it is another feature of the illustrative embodiments to provide an image processing apparatus, and a storing medium that stores an image processing program capable of providing the same game aspect even if any one of a plurality of operating objects different in size is selected.

An image processing apparatus according to the illustrative embodiments is an image processing apparatus that displays on a display an image in which an operating object appearing in a virtual three-dimensional space is seen from a predetermined viewpoint location. The image processing apparatus comprises an operating means, a selecting means, a viewpoint-location setting means, and an image displaying means. The operating means is operated by a player. The selecting means selects the operating object appearing in the virtual three-dimensional space, out of a plurality of the operating objects different in size, based on an operation of the operating means. The viewpoint-location setting means sets the viewpoint location in correspondence with the operating object selected by the selecting means. The image displaying means displays a three-dimensional image including the operating object based on the viewpoint location set by the viewpoint-location setting means.

More specifically, the image processing apparatus (10) displays on a display (34) an image in which an operating object appearing in a virtual three-dimensional space is seen from a predetermined viewpoint location. The operating means (26) is operated by a player. The selecting means (36, 70a, S3-S5) selects the operating object appearing in the virtual three-dimensional space, out of a plurality of the operating objects (72a, 72b, 72c) different in size, based on an operation of the operating means. The viewpoint-location setting means (36, 70b, S7-S17) sets the viewpoint location in correspondence with the operating object selected by the selecting means. Furthermore, the image displaying means (36, 42, 70c, S19) displays a three-dimensional image including the operating object (A, B, C) based on the viewpoint location (E1, E2, E3) set by the viewpoint-location setting means. Therefore, according to the illustrative embodiments, the viewpoint location is set corresponding to the selected operating object so that even if any one of the operating objects different in size is selected, the operating object is displayed as the operating object in the optimum size, thus making it possible to provide the same game aspect.

In a certain embodiment, this image processing apparatus further comprises a viewpoint-location-data storing means (74) for storing each viewpoint location data correlated with each of the plurality of the operating objects. The viewpoint-location setting means reads from the viewpoint-location-data storing means the viewpoint location data corresponding to the operating object selected by the selecting means in order to set the viewpoint location. Therefore, it is possible to easily set the viewpoint location.

In a certain embodiment, each of the viewpoint location data is set to display the operating object as approximately the same in size no matter which operating objects is selected by the selecting means. Therefore, it is possible to render a visual range obstructed by the operating object equal, thus providing the same game aspect.

The viewpoint location data may include distance data (X1, X2, X3) from a point-of-regard (IL, I2, I3), for example. The viewpoint-location setting means reads out the distance data from the point-of-regard corresponding to the operating object selected by the selecting means in order to set the viewpoint location. Therefore, it is possible to easily set the viewpoint distance. In addition, by setting the viewpoint distance corresponding to the size of the operating object, it becomes possible to allow the operating object displayed on a screen to be displayed in the optimum size.

Furthermore, the viewpoint location data may include angle data ($\alpha 1, \alpha 2, \alpha 3$) or height data (H1, H2, H3) from the point-of-regard. The viewpoint-location setting means reads out the angle data or the height data from the point-of-regard corresponding to the operating object selected by the selecting means in order to set the viewpoint location. Therefore, it is possible to easily set a viewpoint angle or a viewpoint height. In addition, by setting the viewpoint angle and the viewpoint height to the optimum location corresponding to the size of the operating object, it becomes possible to allow the operating object displayed on the screen to be displayed in the optimum size.

A storing medium that stores an image processing program according to the illustrative embodiments is a storing medium that stores an image processing program to be executed by an image processing apparatus that is provided with an operating means operated by a player, and displays on a display an image in which an operating object, appearing in a virtual three-dimensional space, is seen from a predetermined viewpoint location. The image processing program of this storing medium includes a selecting step, a viewpoint-location setting step, and an image displaying step, and allows a computer of the above-described image processing apparatus to execute these steps. The selecting step selects the operating object appearing in the virtual three-dimensional space, out of a plurality of the operating objects different in size, based on an operation of the operating means. The viewpoint-location setting step sets the viewpoint location to correspond with the operating object selected by the selecting step. The image displaying step displays a three-dimensional image including the operating object selected by the selecting step based on the viewpoint location set by the viewpoint-location setting step.

According to the storing medium that stores the image processing program, similar to the above-described image processing apparatus, even if any one of the operating objects different in size is selected, the operating object is displayed as the operating object in the optimum size, thus providing the same game aspect.

According to the illustrative embodiments, the viewpoint location is set corresponding to the selected operating object so that even if any one of the operating objects different in size is selected, the operating object is displayed as the operating object in the optimum size. Thus, there is neither an advantage nor a disadvantage depending on the selected operating object so that it is possible to provide the same game aspect. In a fighting game, etc., for example, it is possible to eliminate a feeling of unfairness resulting from the selection of operating objects different in size.

The above described features and other features, aspects and advantages of the illustrative embodiments will become more apparent from the following detailed description of the preferred embodiments when taken in conjunction with the accompanying drawings.

DETAILED DESCRIPTION OF THE PREFERRED EMBODIMENTS

An image processing apparatus 10 shown in FIG. 2 of this embodiment is a video game system, for example, and includes a video game apparatus or a video game machine (hereinafter briefly referred to as a "game machine") 12. A power is supplied to this game machine 12, and this power may be an ordinary AC adaptor (not shown) in the embodiment. The AC adaptor is inserted into a home-use conventional wall outlet, and converts a home-use power into a low DC voltage signal appropriate for driving the game machine 12. In another embodiment, a battery may be used as the power.

The game machine 12 includes an approximately cubic housing 14, and at an upper end of the housing 14, an optical disk drive 16 is provided. In the optical disk drive 16, an optical disk 18, which is one example of an information storing medium that stores a game program (image processing program), is attached. At a front surface of the housing 14, a plurality of (4 in this embodiment) connectors 20 are provided. These connectors 20 are connectors for connecting a controller 22 to the game machine 12 by a cable 24, and in this embodiment, it is possible to connect a maximum of four controllers to the game machine 12.

In the controller 22, an operating means (control) 26 is provided at its upper, lower, and side surfaces, for example. The operating means 26 includes two analog joysticks, one cross key, and a plurality of button switches, for example. One analog joystick is used for inputting a moving direction and/ or a moving speed or a moving amount of a player character (moving image character operable by the player using the controller 22) as an operating object by a slanting amount and a slanting direction of the stick. Similarly, another analog joystick controls a movement of the player character by a slanting direction, for example. The cross switch is used for instructing the moving direction of the player character in place of the analog joystick. The button switch is used for instructing an action of the player character, adjusting the moving speed of the player character, etc. Furthermore, the button switch controls a menu selection, and a pointer or a cursor movement, for example.

It is noted that in this embodiment, the controller 22 is connected to the game machine 12 by the cable 24. However, the controller 22 may be connected to the game machine 12 by another method such as in a wireless manner via an electromagnetic wave (radio wave or infrared ray, for example). In addition, needless to say, specific structure of the operating means of the controller 22 is not limited to the structure of the embodiment, and an arbitrary deformation is possible. One analog joystick may be sufficient, or may not be used at all, for example. The cross switch may not be used.

Below the connector 20 at the front surface of the housing 14 of the game machine 12, at least one (2 in this embodiment) memory slot 28 is provided. A memory card 30 is inserted into this memory slot 28. The memory card 30 is used for loading and temporarily storing a game program, and data read out from the optical disk 18, saving game data (result of the game, for example) of the game played using this game system 10, and so forth.

At a rear surface of the housing 14 of the game machine 12, an AV cable connector (not shown) is provided, and using the connector, a monitor (display) 34 is connected to the game machine 12 through an AV cable 32. Typically, the monitor 34 is a color television receiver, and the AV cable 32 inputs a video signal from the game machine 12 to a video input terminal of the color television, and applies a sound signal to an audio input terminal. Therefore, a game image of a three-dimensional (3D) video game may be displayed on a screen of the color television 34, and a game sound (stereo, for example) such as a game music (BGM), a sound effect, etc., may be output from speakers 34a on both sides.

In this game system 10, in order for a user or a game player to play the game (or another application), the user, first, turns on the power of the game machine 12, next, the user selects the appropriate optical disk 18 that stores a video game (or another application intended to play), and loads the optical disk 18 into the disk drive 16 of the game machine 12. Accordingly, the user allows the game machine 12 to start executing the video game or another application based on software stored in the optical disk 18. The user operates the controller 22 in order to apply an input to the game machine 12. The user starts the game or another application by operating one of the features of the operating means 26, for example. By moving another feature of the operating means 26, the user can select the operating object actually played out of a plurality of the operating objects, move the operating object (player object) to a different direction, for example.

Figure 2:
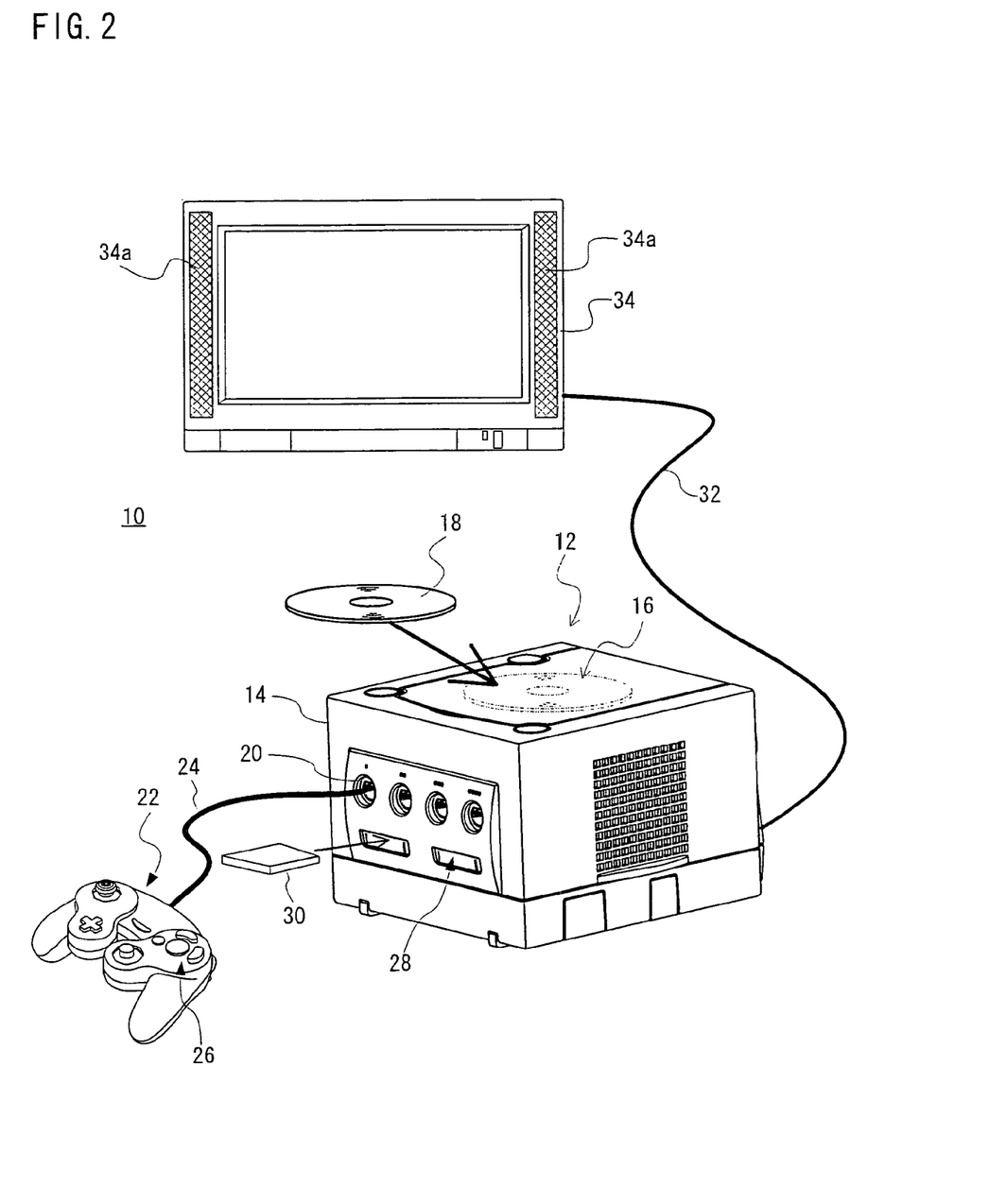
FIG. 2 is an illustrative view showing an outline of an image processing apparatus of one embodiment.
Figure 3:
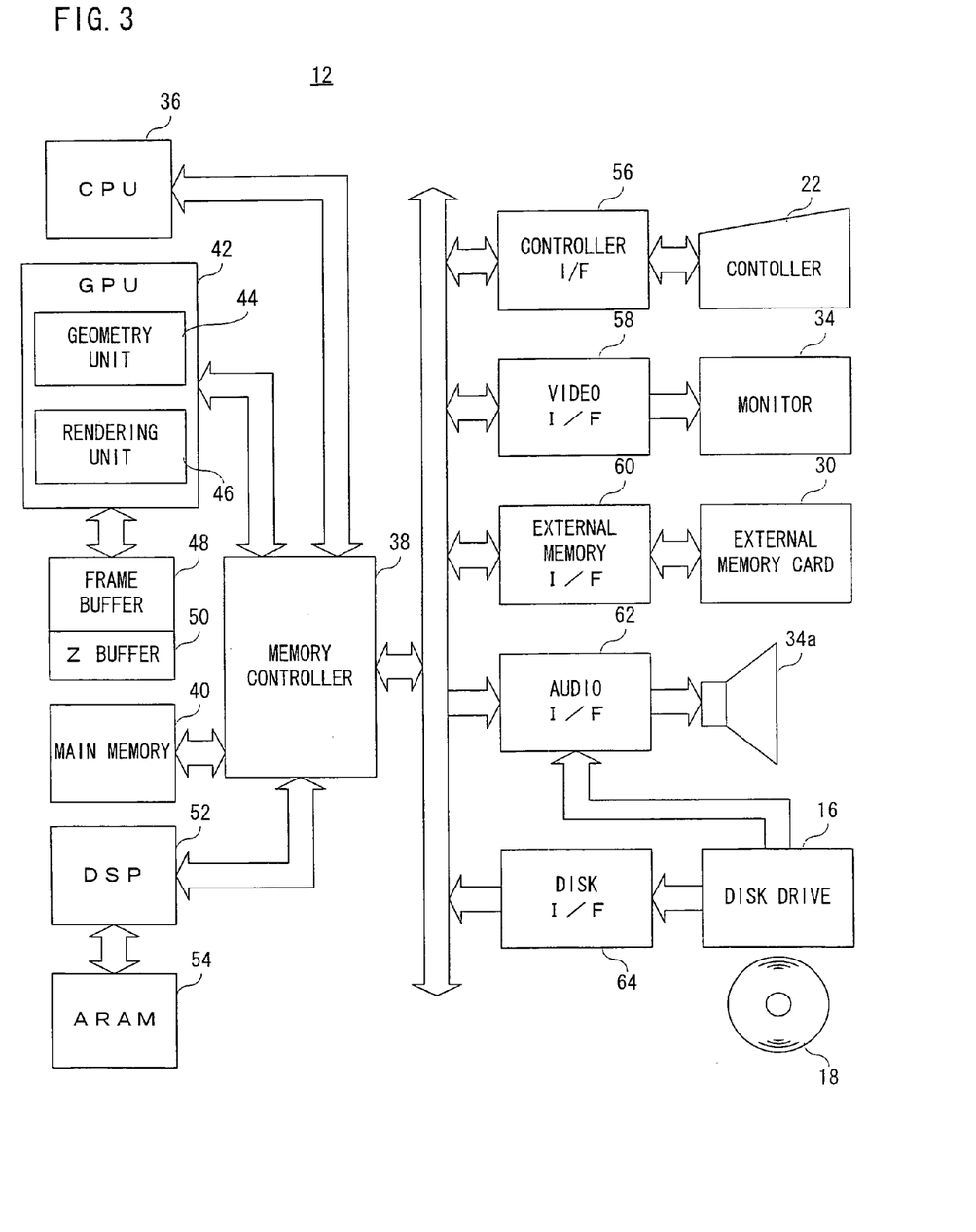
FIG. 3 is a block diagram showing one example of internal structure of a game machine in a FIG. 2 embodiment.

FIG. 3 is a block diagram showing electric internal structure of the video game system 10 of the FIG. 2 embodiment. In the video game machine 12, a central processing unit (hereinafter briefly referred to as "CPU") 36 is provided. The CPU 36 is also called as a computer or a processor, etc., and is responsible for entirely controlling the game machine. The CPU 36 or computer functions as a game processor, and is joined to the memory controller 38 via a bus. Primarily, the memory controller 38 controls a writing or a reading of the main memory 40 joined via the bus under the control of the CPU 36. The main memory 40 is used as a working area or a buffer area. To the memory controller 38, a GPU (Graphics Processing Unit) 42 is joined.

The GPU 42 forms one portion of a rendering means, is constructed of a single chip ASIC, for example, and receives a graphics command (rendering instruction) from the CPU 36 via the memory controller 38 so as to generate a three-dimensional (3D) game image by a geometry unit 44 and a rendering unit 46 according to that command. That is, the geometry unit 44 performs coordinate operation processes such as a rotation, a movement, a deformation, etc., of various characters and objects in a three-dimensional coordinate system (constructed of a plurality of polygons. In addition, the polygon is a polygonal plain surface defined by at least three vertexes coordinates). The rendering unit 46 performs rendering processes such as a texture mapping for attaching a texture (texture image) to each polygon of the various objects, and so forth. Therefore, 3D image data to be displayed on the game screen is created by the GPU 42, and the image data is rendered (stored) within a frame buffer 48.

It is noted that the data (primitive or polygon or texture, etc.) necessary for the GPU 42 to execute the graphics command is obtained by the GPU 42 from the main memory 40 via the memory controller 38.

The frame buffer 48 is a memory for rendering (accumulating) the image data worth one frame of a luster scanning monitor 34, for example, and overwritten by the GPU 42 by each one frame. As a result of a video I/F 58 described later reading out the data of the frame buffer 48 via the memory controller 38, the game image is displayed on the screen of the monitor 34. It is noted that a capacity of the frame buffer 48 has a largeness corresponding to the number of pixels (pixel or dot) of the screen intended to be displayed. The frame buffer 48 has the number of pixels corresponding to the number of pixels (storing location or address) of the display or the monitor 34, for example.

In addition, a Z buffer 50 has a storing capacity equal to the number of pixels (storing location or address) corresponding to the frame buffer 48 multiplied by the number of bits of depth data per one pixel, and stores depth information or the depth data (Z value) of dots corresponding to each storing location of the frame buffer 48.

It is noted that both the frame buffer 48 and the Z buffer 50 may be constructed using one portion of the main memory 40.

The memory controller 38 is also joined to a sub memory (ARAM) 54 via a DSP (Digital Signal Processor) 52. Therefore, the memory controller 38 controls the writing and/or reading-out of not only the main memory 40 but also the ARAM 54 under the control of the CPU 36.

The DSP 52 functions as a sound processor, and executes an audio processing task, for example. The ARAM 54 may be used as an audio memory for storing sound waveform data (sound data) read out from the disk 18, for example. The DSP 52 receives an audio processing command from the CPU 36 via the memory controller 38, extracts the necessary sound waveform data in correspondence with the command, and performs processes/mixings of a pitch modulation, a mixing between sound data and effect data, etc., for example. The audio processing command is issued by reading out one after another and analyzing performance control data (sound data) written in the main memory 40 as a result of a sound processing program, etc., being executed, for example. The sound waveform data is read out one after another, and processed by the DSP 52 for generating a game audio content. The generated resultant content or audio output data is buffered into the main memory 40, for example, and next, transferred to an audio I/F 62 so as to be output as a stereo sound, for example, by the speaker 34*a*. Therefore, the sound is output from the speaker 34*a*.

It is noted that it is apparent that the audio data to be generated is not limited to a use for a 2ch stereo reproduction, and capable of corresponding to a surround reproduction of 5.1ch, 6.1ch, 7.1ch, etc., or a monophonic reproduction, etc., for example.

Furthermore, the memory controller 38 is joined to each interface (I/F) 56, 58, 60, 62, and 64 by the bus.

The controller I/F 56 is an interface for the controller 22, and applies to the CPU 36 an operating signal or data of the operating means 26 of the controller 22 through the memory controller 38.

The video I/F 58 accesses the frame buffer 48, reads out the image data generated by the GPU 42, and applies to the monitor 34 the image signal or the image data (digital RGB pixel value) via the AV cable 32 (FIG. 2).

The external I/F 60 joins the memory card 30 (FIG. 2) inserted in the front surface of the game machine 12 to the memory controller 38. Thereby, it enables the CPU 36 to write the data into this memory card 30 or read out the data from the memory card 30 via the memory controller 38.

The audio I/F 62 receives the audio data applied from the buffer through the memory controller 38 or an audio stream read out from the optical disk 18, and applies to the speaker 34*a* of the monitor 34 the audio signal (sound signal) corresponding thereto.

It is noted that in a case of the stereo sound, at least one speaker 34*a* is provided on each of both sides. In addition, in a case of the surround reproduction, besides the speaker 34*a* of the monitor 34, five additional speakers and one low sound-use speaker (in a case of a 7.1ch) may be provided via an AV amplifier, for example Furthermore, the disk I/F 64 joins the disk drive 16 to the memory controller 38, and therefore, the CPU 36 controls the disk drive 16. Program data, object data, texture data, the sound data, etc., read out from the optical disk 18 by this disk drive 16 are written into the main memory 40 under the control of the CPU 36.

Figure 4:
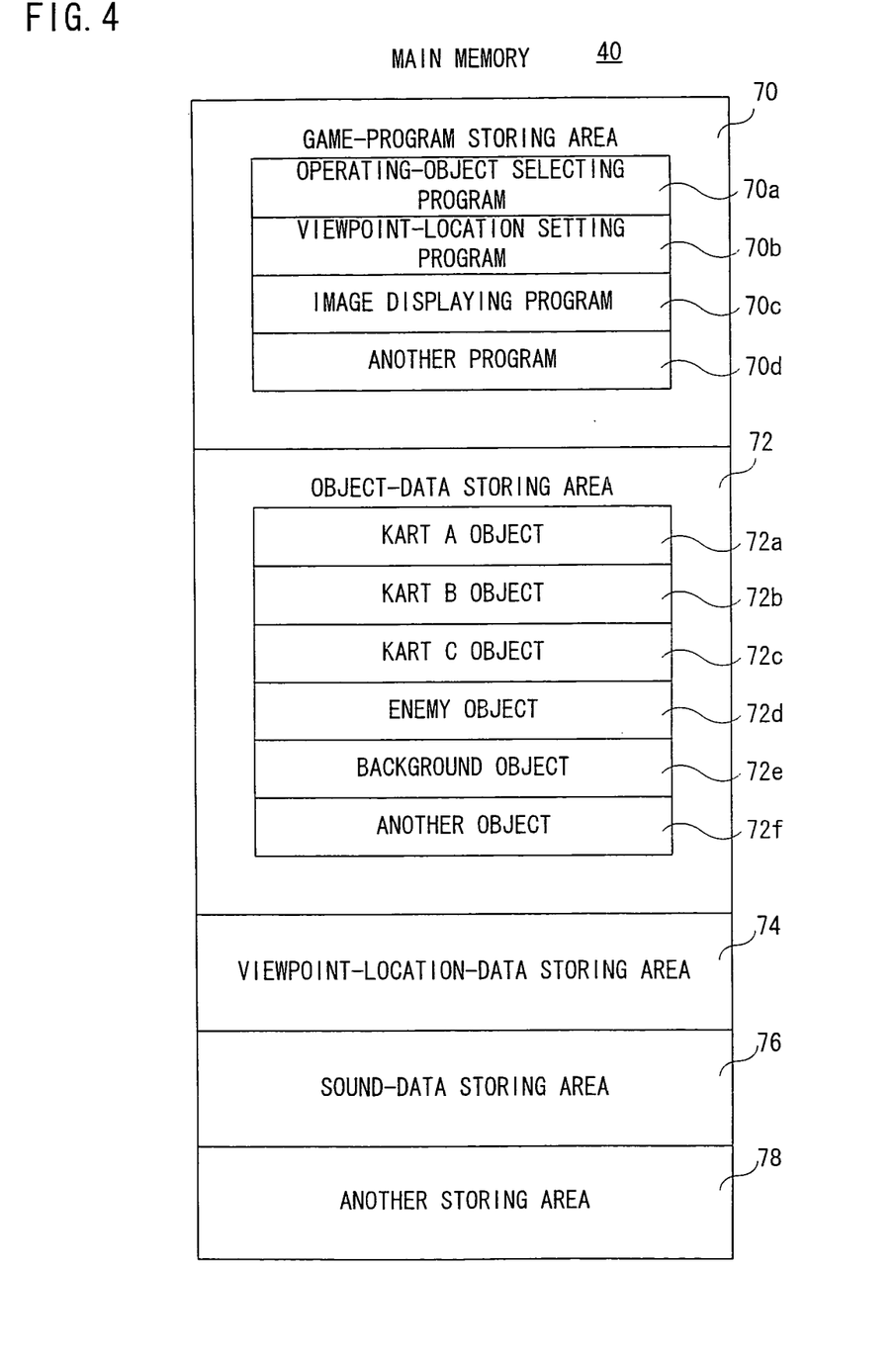
FIG. 4 is an illustrative view showing one example of a memory map of a main memory in FIG. 3.

FIG. 4 shows a memory map of the main memory 40. The main memory 40 includes a game-program storing area 70, an object-data storing area 72, a viewpoint-location-data storing area 74, a sound-data storing area 76, and a storing area for other data 78.

In the game-program storing area 70, the game program read out from the optical disk 18 is stored entirely at once or partially and sequentially. The CPU 36 executes the game process according to this game program. The game program includes an operating-object selecting program 70*a*, a viewpoint-location setting program 70*b*, an image displaying program 70*c*, and other various programs 70*d* necessary for a proceeding of the game in this embodiment. It is noted that the operating-object selecting program 70*a* is a program for selecting the operation object appearing in the virtual space to be played, out of a plurality of the operating objects. The viewpoint-location setting program 70*b* is a program for setting the viewpoint location (camera location) of the virtual camera corresponding to the selected operating object. The image displaying program 70*c* is a program for displaying the three-dimensional game image including the operating object based on the set viewpoint location.

In the object-data storing area 72, kart A object data 72*a*, kart B object data 72*b*, kart C object data 72*c*, enemy object data 72*d*, background object data 72*e*, another object data 72*f*, etc., are stored. The kart A object data 72*a*, the kart B object data 72*b*, and the kart C object data 72*c* are a plurality of the operating objects selected and operated by the player. In this embodiment, a race game using the kart is taken into consideration, and three karts A, B, and C different in size are prepared. Each object is formed of polygons, and each data includes information such as its location coordinates, its state, etc.

In the viewpoint-location-data storing area 74, viewpoint location data by each plurality of the operating objects is stored, and in the sound-data storing area 76, sound data regarding a game BGM, etc., are stored. In addition, in the storing area for other data 78, various kinds of data, a flag, etc., necessary for the proceeding of the game are stored. It is noted that in the object-data storing area 72, the viewpoint-location-data storing area 74, and the sound-data storing area 76, etc., of the main memory 40, each data is loaded from the optical disk 18 entirely at once, or partially and sequentially as required.

Figure 5:
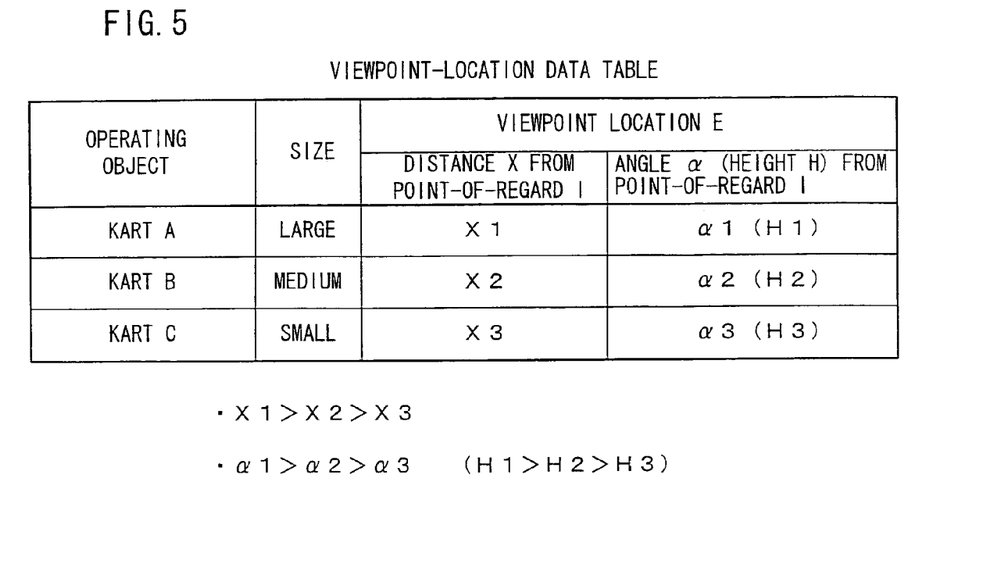
FIG. 5 is an illustrative view showing one example of a viewpoint location data table.
Figure 6:
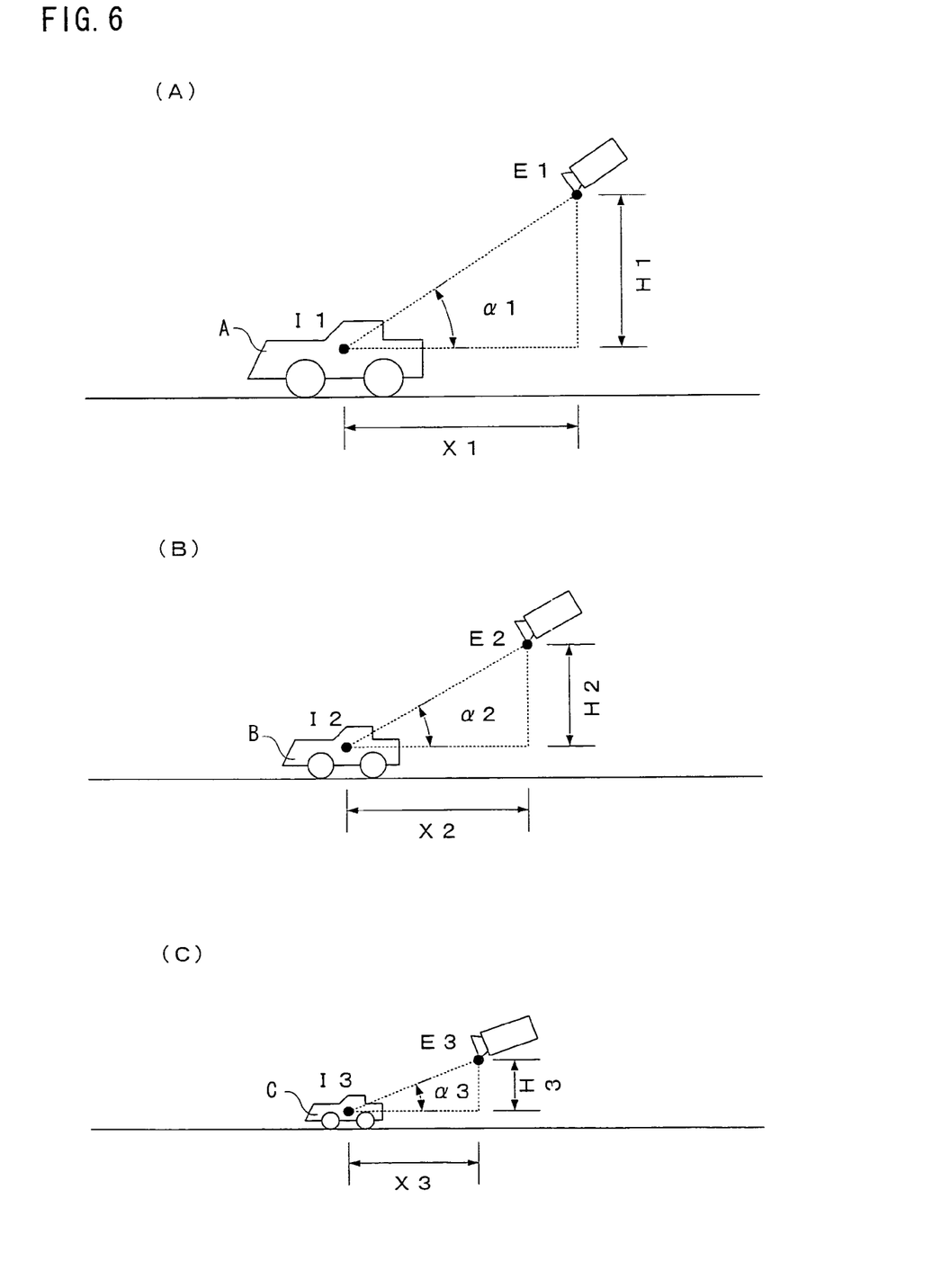
FIG. 6 is an illustrative view showing one example of a location relationship between an operating object and its viewpoint location.

FIG. 5 shows one example of a viewpoint-location data table stored in the viewpoint-location-data storing area 74. In addition, FIG. 6 shows one example of a location relationship between the operating object and the viewpoint location thereof based on the viewpoint location data. As FIG. 5 shows, in the viewpoint-location-data storing area 74, viewpoint location data regarding unique viewpoint locations E1, E2, and E3 each of which is correlated with the kart A, B, and C as a plurality of the operating objects is stored in advance. As understood from FIG. 6, the viewpoint locations E1, E2, and E3 are set in such a manner as to be located at an obliquely upper back of points-of-regard I1, I2, and I3. It is noted that the points-of-regard I1, I2, and I3 may be set to certain points of each operating object A, B, and C such as a center of gravity as shown in FIG. 6, for example. The viewpoint location E moves within the virtual three-dimensional space with a point-of-regard I while basically maintaining a relative location relationship with the point-of-regard I in accordance with the movement of the operating object in the proceeding of the game.

The viewpoint location E is determined by a distance X from the point-of-regard I and an angle $\alpha$ so that the viewpoint location data includes distance data from the point-of-regard and angle data from the point-of-regard, for example. In this embodiment, the kart A is a large size, the kart B is a medium size, and the kart C is a small size so that distances (horizontal distance) X1, X2, and X3 from the points-of-regard I1, I2, and I3 of each of the camera locations E1, E2, and E3 are set by a relationship of X1>X2>X3, for example, and the angles (elevation angle or depression angle) $\alpha 1$, $\alpha 2$, and $\alpha 3$ from each of the points-of-regard I1, I2, and I3 are set by the relationship of $\alpha 1 > \alpha 2 > \alpha 3$, for example.

It is noted that the viewpoint location E is also determined by the distance X and a height H from the point-of-regard I, for example so that in another embodiment, the viewpoint location data may include height (vertical distance) data from the point-of-regard in place of the angle data as shown in FIG. 5 in addition thereto. In this case, heights H1, H2, and H3 of the points-of-regard I1, I2, and I3 of each of the camera locations E1, E2, and E3 are set by a relationship of H1>H2>H3, for example.

Each of the viewpoint location data is set in such a manner that even when any one of a plurality of the operating objects A, B, and C is selected, the operating object is displayed in the optimum size that may not damage a feeling of equality as the game, that is, the viewpoint location is rendered appropriate for the operating object. More specifically, it is set in such a manner that the larger the size of the kart, the larger the distance X and the angle $\alpha$ (height H) from the point-of-regard I, and the smaller the size of the kart, the smaller the distance X and the angle α (height H) from the point-of-regard I. Thus, by setting the viewpoint distance, the viewpoint angle, or the height of the viewpoint corresponding to the size of the operating object, it is possible to display the operating object to be displayed on the screen in the optimum size.

In addition, each of the viewpoint location data is preferably set to be displayed in such a manner that each of the operating objects A, B, and C has approximately the same size even if any one of a plurality of the operating objects A, B, and C is selected. Thereby, it renders a range obstructed by each operating object approximately equal, thus providing the same game aspect.

Furthermore, the unique viewpoint location data to be set to each operating object is stored in advance so that it is possible to set the viewpoint location by a simple process.

Figure 7:
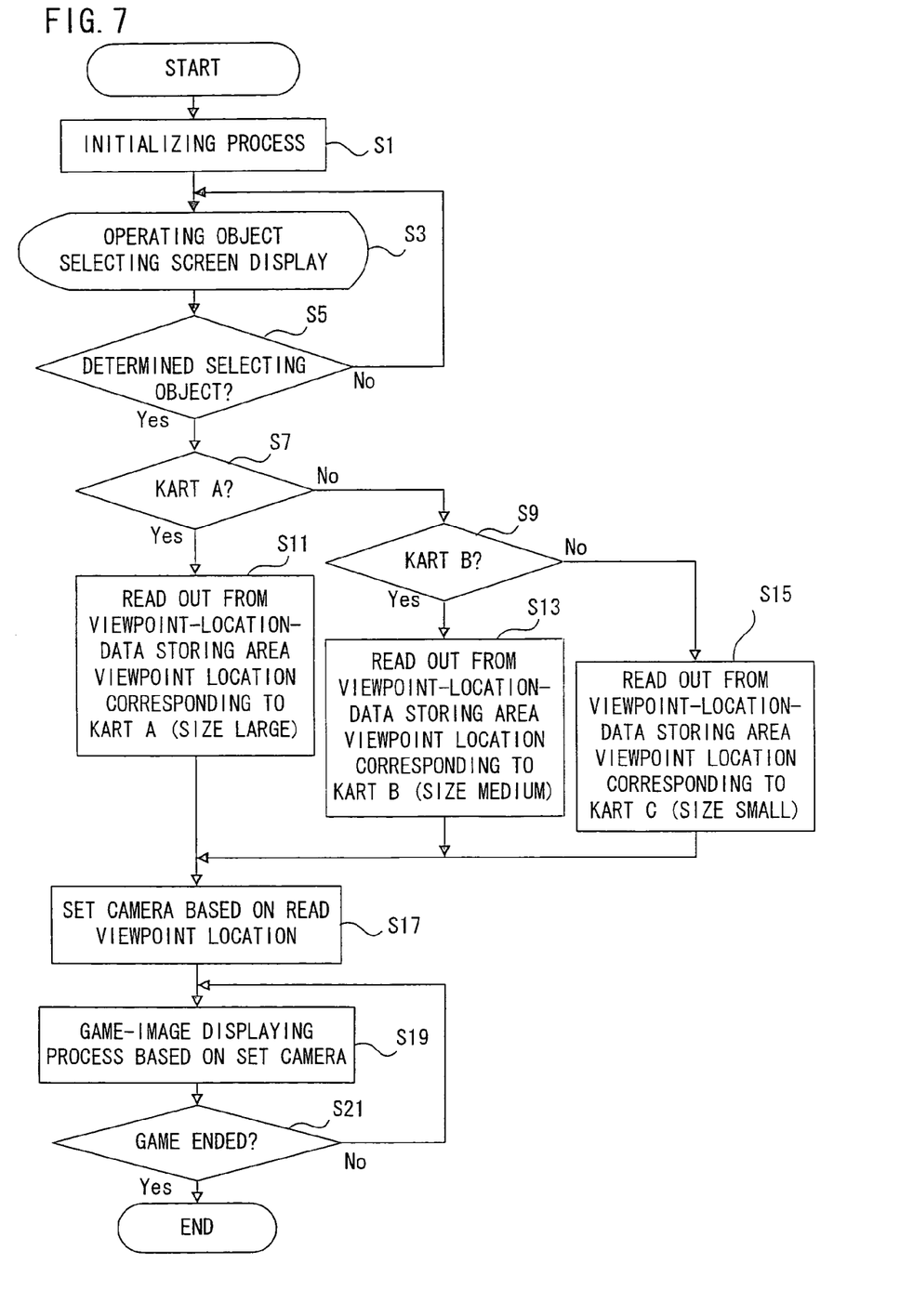
FIG. 7 is a flowchart showing one example of an operation of an image processing apparatus in the FIG. 2 embodiment.

FIG. 7 shows one example of an operation of the image processing apparatus 10. When the game is played, the optical disk 18 is set to the game machine 12 as described above, and when the power is input, the CPU 36 executes an initializing process such as a memory clear, etc., reads out the program and the data from the optical disk 18, and loads the program and the data necessary for the main memory 40 as shown in FIG. 4 in a first step S1 in FIG. 7.

Figure 8:
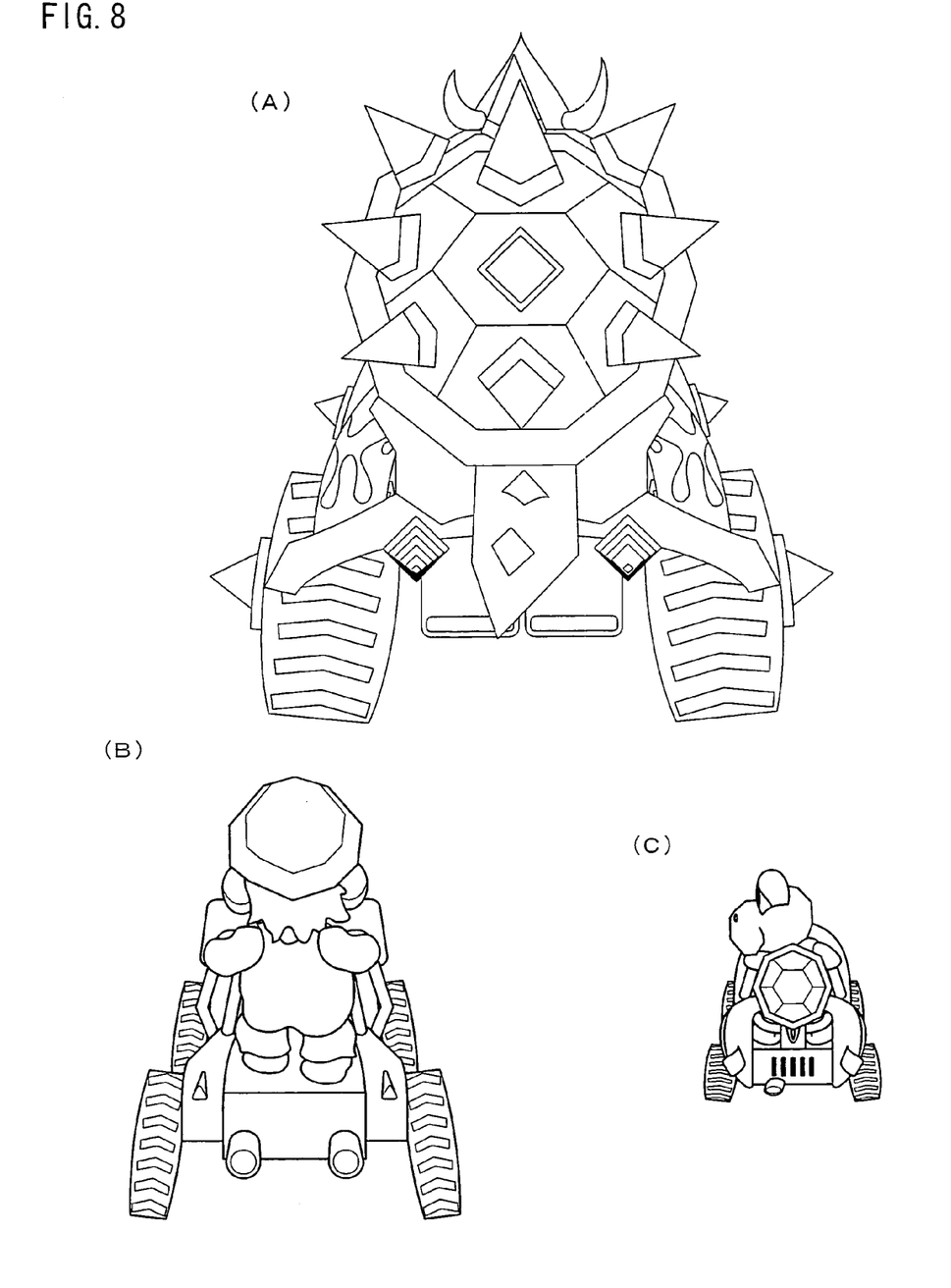
FIG. 8 is an illustrative view showing a plurality of selectable operating objects different in size in the FIG. 2 embodiment, (A) shows a large-sized kart A object, (B) shows a medium-sized kart B object, and (C) shows a small-sized kart C object.

When starting the process according to this program, the CPU 36 reads out the data necessary for displaying an operating object selecting screen not shown from the object-data storing area 72, the storing area for other data 78, etc., of the main memory 40, renders the selecting screen in the frame buffer 48, using the GPU 42, and starts the video I/F 58, for example. Thereby, the selecting screen for selecting the operating object appearing in the virtual three-dimensional space and actually operated out of a plurality of the operating objects is displayed on the monitor 34. On the operating object selecting screen not shown, the operating objects A, B, and C as shown in FIG. 8 are separately or all at once displayed, and subject to selection by the player. As understood from FIG. 8, the three operating objects A, B, and C in this embodiment are different in size to each other. The operating object A is the largest, and the operating object C is the smallest.

Next, the CPU 36 determines whether or not the operating object is determined in a step S5. If "NO" in this step S5, that is, in the case that an operation inputting signal from the controller 22 is not a signal for determining the operating object, etc., the process returns to the step S3 so as to repeat the process, and urges the player to determine the operating object. On the other hand, if "YES" in the step S5, that is, in the case that the operation inputting signal is the signal for determining the selection of the operating object, the CPU 36 determines which operating object is selected in succeeding steps S7 and S9.

In the step S7, the CPU 36 determines whether or not the kart A is selected. If "YES", the CPU 36 reads out the viewpoint location data corresponding to the kart A from the viewpoint-location-data storing area 74 into a predetermined work area of the main memory 40 in a succeeding step S11. On the other hand, if "NO" in the step S7, the CPU 36 determines whether or not the kart B is selected in the succeeding step S9. If "YES" in this step S9, the CPU 36 reads out the viewpoint location data corresponding to the kart B from the viewpoint-location-data storing area 74 in a succeeding step S13. On the other hand, if "NO" in the step S9, this means that the operating object C has been selected in this embodiment so that the CPU 36 reads out the viewpoint location data corresponding to the kart C from the viewpoint-location-data storing area 74 in a succeeding step S15.

Subsequently, in a step S17, the CPU 36 sets a location of the virtual camera in the virtual three-dimensional space based on the read viewpoint location data. That is, as shown in FIG. 6, in a case that the kart A is selected, the camera location E1 is set based on the viewpoint location data (FIG. 5) corresponding to the kart A, in a case that the kart B is selected, the camera location E2 is set based on the viewpoint location data corresponding to the kart B, or in a case that the kart C is selected, the camera location E3 is set based on the viewpoint location data corresponding to the kart C.

Furthermore, in a step S19, using the GPU 42, etc., the CPU 36 executes a game-image displaying process based on the set camera. Therefore, the three-dimensional game image based on the viewpoint locations set to each operating object is displayed on the monitor 34. More specifically, the game is made to proceed corresponding to the program, the operation input from the operation means 26, etc., the location of the operating object in the world coordinate system is updated, and the point-of-regard location and the virtual camera location are updated corresponding thereto. It is noted that the relative location relationship between the point-of-regard location and the camera location is maintained. Then, the locations of the operating object, the enemy object, the background object, etc., are converted into a three-dimensional camera coordinate system that uses the virtual camera as a reference, the three-dimensional camera coordinate system is converted into a two-dimensional projected plain coordinate system, and a clipping (cutting of an invisible world), etc., are executed in addition thereto. Furthermore, each of the necessary textures such as the operating object, the enemy object, other objects, for example, is read out, and mapped to each of the objects. Thus, the rendered three-dimensional image data is rendered into the frame buffer 48. Therefore, as a result of the game-image displaying process in this step S19, the three-dimensional game image based on the virtual camera locations set to each operating object is displayed on the monitor 34. It is noted that although not illustrated, the sound process, etc., are also executed, and a game BGM, etc., are also output form the speaker 34a.

Figure 9:
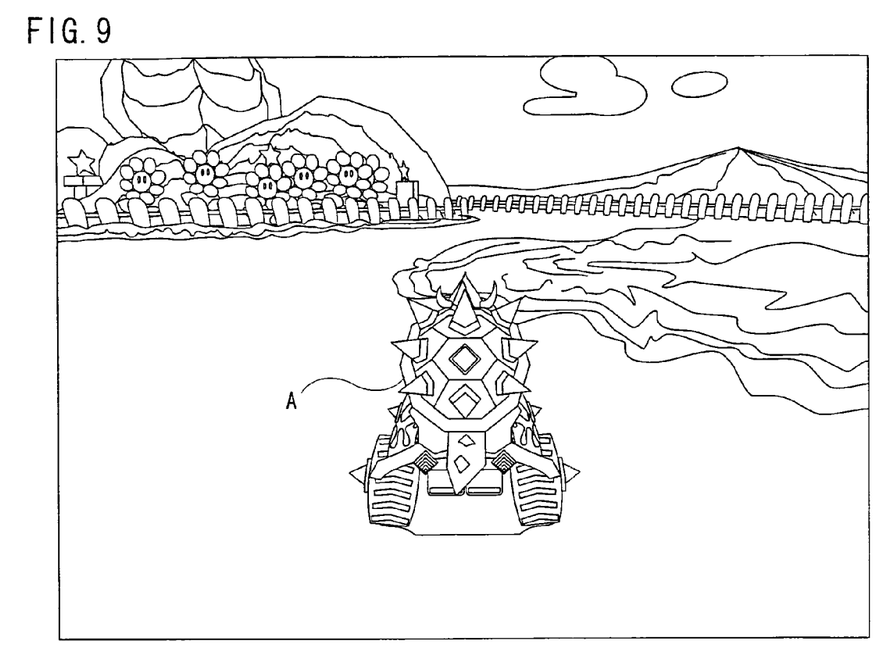
FIG. 9 is an illustrative view showing one example of a game image in a case that the large-sized kart A object is selected in the FIG. 2 embodiment.
Figure 10:
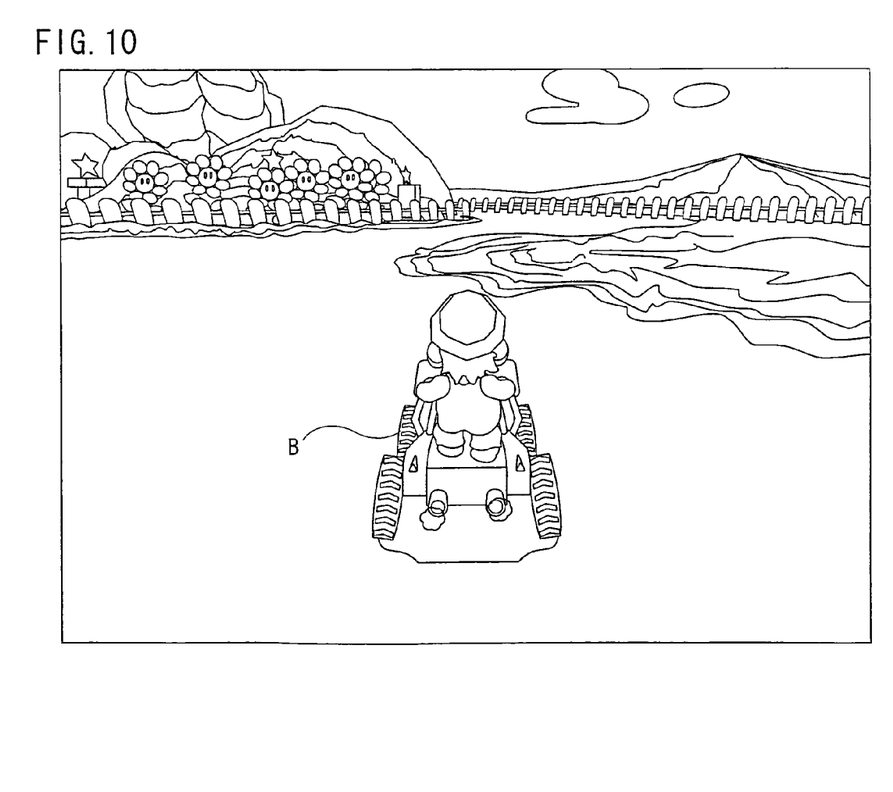
FIG. 10 is an illustrative view showing one example of the game image in a case that the medium-sized kart B object is selected in the FIG. 2 embodiment.
Figure 11:
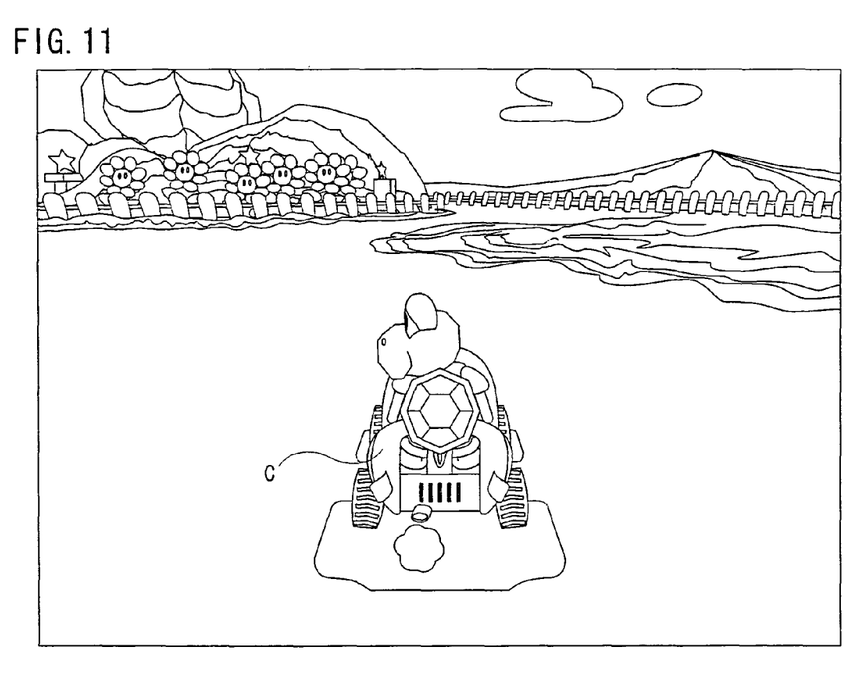
FIG. 11 is an illustrative view showing one example of the game image in a case that the small-sized kart C object is selected in the FIG. 2 embodiment.

In FIG. 9, FIG. 10, and FIG. 11, one example of the game image (displayed screen) displayed on the monitor 34 by the process in this step S19 is shown. FIG. 9 shows an image of a case that the large-sized kart A is selected, FIG. 10 shows an image of a case that the medium-sized kart B is selected, and FIG. 11 shows an image of a case that the small-sized kart C is selected. It is noted that a difference of the viewpoint location by each operating object is also seen in the difference in an off-set length from a lower edge of the displayed screen to each operating object (or its shadow), in the difference of a course of the background to be seen, etc.

As understood from FIGS. 9-11, each operating object A, B, and C is displayed in the optimum size. Furthermore, in this embodiment, each operating object A, B, and C is displayed in the display screen as the operating object approximately the same in size. Therefore, the range obstructed by the operating object itself is approximately the same in range, and in a case of selecting any one of the operating objects, it is possible to provide the same game aspect. In addition, similarly, it is possible to apply approximately the same operability on an operating point of view.

In addition, compared to the prior art, in a case of the large-sized operating object A, in the prior art, as shown in FIG. 1, the range obstructed by the operating object itself is too large so that a front area of the course is significantly hidden, thus the player finds it difficult to make a course forecast. However, in this embodiment, as shown in FIG. 9, the obstructed range is appropriate, and a path of the course, etc., are appropriately displayed so that it is probably not difficult to make the course forecast. In addition, in a case of the small-sized operating object C as shown in FIG. 11, the object is displayed in an appropriate size so that it is not probable that an impact of the game is lost.

The game-image displaying process in the step S19 in FIG. 7 is repeated until it is determined that the game is ended in a succeeding step S21. If the game has not ended as determined at step S21, the game is made to proceed according to the program, the operation input from the operating means 26, etc., and the game image is displayed. On the other hand, if the check at step S21 yields "YES", that is, in a case that it is determined that the game is ended is selected, or in a case that the game is over, etc., the CPU 36 executes a game ending process, and ends this process.

According to this illustrative embodiment, the viewpoint location is set according to the selected operating object so that even if any operating object different in size is selected, the operating object can be displayed in the optimum size for the operating object. Furthermore, in this illustrative embodiment, it is possible to display the operating object as other operating object approximately the same in size, thus rendering the viewpoint range obstructed by the operating objects approximately equal. Therefore, there is neither an advantage nor a disadvantage in the game depending on the selected operating object so that it is possible to provide the same game aspect. In addition, in a fighting game, for example, it is possible to eliminate a feeling of unfairness which results from selecting different size operating objects.

It is noted that in the above illustrative embodiment, based on each of the viewpoint location data correlated by each plurality of the operating objects, each viewpoint location is set. However, in a case that the operating objects approximately the same in size exist in plural number, the same viewpoint location may be set unless the feeling of equality of the game is lost to the operating objects. In addition, in a case of having a multiplicity of (1000 or more, for example) the operating objects, thus rendering a data amount large, etc., based on the viewpoint location data set in advance for the operating object in small number, the viewpoint location data adapted to the remaining numerous operating objects may be calculated by an interpolation, for example.

Although the example embodiment presented herein has been described and illustrated in detail, it is clearly understood that the same is by way of illustration and example only and is not to be taken by way of limitation, the spirit and scope of the example embodiment being limited only by the terms of the appended claims.

What is claimed is:

1. An image processing apparatus that displays on a display an image in which an operating object appearing in a virtual three-dimensional space is seen from a predetermined viewpoint location, comprising:
    an operation controller operated by a player;
    a selecting unit for selecting the operating object appearing in said virtual three-dimensional space, out of a plurality of the operating objects different in size, based on an operation of said operation controller;
    a viewpoint-location unit for setting the viewpoint location in correspondence with said operating object selected by said selecting unit; and
    an image displaying unit for displaying a three-dimensional image including said operating object based on said viewpoint location set by said viewpoint-location setting unit,
    wherein said viewpoint-location setting unit sets the viewpoint-locations in such a manner so that each of operating objects selected by said selecting unit is displayed to have approximately the same size, even if anyone operating object is selected out of said plurality of operating objects different in size.

2. An image processing apparatus according to claim 1, further comprising:
    viewpoint-location-data storing locations for storing each viewpoint location data correlated with each of said plurality of the operating objects; wherein
    said viewpoint-location setting unit reads out from said viewpoint-location-data storing locations said viewpoint location data corresponding to said operating object selected by said selecting unit to set said viewpoint location.

3. An image processing apparatus according to claim 2, wherein said viewpoint location data includes distance data from a point-of-regard, said viewpoint-location setting unit reads out said distance data corresponding to said operating object selected by said selecting unit to set said viewpoint location.

4. An image processing apparatus according to claim 2, wherein
    said viewpoint location data includes angle data or height data from the point-of-regard,
    said viewpoint-location setting unit reads out said angle data or said height data corresponding to said operating object selected by said selecting unit to set said viewpoint location.

5. A non-transitory storing medium that stores an image processing program to be executed by an image processing apparatus that is provided with an operation controller operated by a player, and displays on a display an image in which an operating object appearing in a virtual three-dimensional space is seen from a predetermined viewpoint location, said image processing program allows a computer of said image processing apparatus to execute:
    selecting the operating object appearing in said virtual three-dimensional space, out of a plurality of the operating objects different in size, based on an operation of said operation controller;
    setting the viewpoint location in correspondence with said operating object elected by said selecting; and
    displaying a three-dimensional image including said operating object selected by said selecting based on said viewpoint location set by said viewpoint-location setting, wherein
    said setting the viewpoint-location sets the viewpoint-locations in such a manner so that each of operating objects selected by said selecting unit is displayed to have approximately the same size, even if anyone operating object is selected out of said plurality of operating objects different in size.

6. A non-transitory storing medium that stores an image processing program according to claim 5, said image processing apparatus further comprises viewpoint-location-data storing locations for storing each viewpoint location data correlated with each of said plurality of the operating objects; wherein said viewpoint-location setting reads out from said viewpoint-location-data storing locations said viewpoint location data corresponding to said operating object selected by said selecting so as to set said viewpoint location.

7. A non-transitory storing medium that stores an image processing program according to claim 6, wherein
    each of said viewpoint location data is set in such a manner as to be displayed as the operating object approximately the same in size even if anyone of the operating objects is selected by said selecting.

8. A non-transitory storing medium that stores an image processing program according to claim 6, wherein
   said viewpoint location data includes distance data from a point-of-regard,
   said viewpoint-location setting reads out said distance data corresponding to said operating object selected by said selecting so as to set said viewpoint location.

9. A non-transitory storing medium that stores an image processing program according to claim 6, wherein
   said viewpoint location data includes angle data or height data from the point-of-regard,
   said viewpoint-location setting reads out said angle data or said height data corresponding to said operating object selected by said selecting so as to set said viewpoint location.

* * * * *